United States Patent [19]

Telander et al.

[11] Patent Number: 5,788,835
[45] Date of Patent: Aug. 4, 1998

[54] WATER PURIFIER HAVING DEGASSOR AND MEMBRANE DISTILLATION ELEMENTS

[75] Inventors: Frederic Telander, Bromma; Aapo Sääsk, Järfälla, both of Sweden; Seppo Syrjälä, Åbo, Finland

[73] Assignee: H.V. Water Purification AB, Stockholm, Sweden

[21] Appl. No.: 492,098

[22] PCT Filed: Jan. 5, 1994

[86] PCT No.: PCT/SE94/00007

§ 371 Date: Jun. 29, 1995

§ 102(e) Date: Jun. 29, 1995

[87] PCT Pub. No.: WO94/15876

PCT Pub. Date: Jul. 21, 1994

[30] Foreign Application Priority Data

Jan. 7, 1993 [SE] Sweden ............................. 9300020

[51] Int. Cl.$^6$ .................... B01D 17/12; B01D 61/36; B01D 61/58
[52] U.S. Cl. ................... 210/103; 96/157; 96/173; 210/104; 210/149; 210/180; 210/188; 210/195.2; 210/257.2; 210/640
[58] Field of Search ............... 95/241; 96/155, 96/157, 158, 159, 160, 170, 168, 173; 210/86, 103, 104, 134, 149, 188, 195.2, 257.2, 259, 652, 744, 806, 175, 184, 321.6; 202/176, 177, 180, 181; 203/10

[56] References Cited

U.S. PATENT DOCUMENTS

| | | | |
|---|---|---|---|
| 3,632,505 | 1/1972 | Nelson | 210/652 |
| 3,841,976 | 10/1974 | Scott et al. | 203/10 |
| 4,737,283 | 4/1988 | Gresch | 96/170 |
| 4,957,200 | 9/1990 | Turner et al. | 210/181 |
| 5,156,739 | 10/1992 | Dawson et al. | 210/321.8 |
| 5,225,073 | 7/1993 | Billiet et al. | 210/188 |
| 5,250,183 | 10/1993 | Sawada et al. | 210/257.2 |
| 5,338,456 | 8/1994 | Stivers | 210/652 |

FOREIGN PATENT DOCUMENTS

| | | | |
|---|---|---|---|
| 0 118 760 | 9/1984 | European Pat. Off. | |
| 2354870 | 5/1975 | Germany | 210/652 |
| 3243817 | 7/1984 | Germany | 210/652 |
| 3441 190 | 5/1986 | Germany | |
| 59-32990 | 2/1984 | Japan | 210/321.6 |
| 62-273095 | 11/1987 | Japan | 210/321.6 |

*Primary Examiner*—Joseph W. Drodge
*Attorney, Agent, or Firm*—Jacobson, Price, Holman & Stern, PLLC

[57] ABSTRACT

A water purifier which works in accordance with the membrane distillation principle includes a degassor for degassing incoming crude water prior to commencing the membrane distillation precess; a membrane for the membrane distillation of degassed water; and an outlet which functions to discharge a residual quantity of degassed undistilled water when a degassed undistilled water level has fallen to a predetermined lower level in a container which receives the crude water to be purified. The container is provided with an upper level sensor and a lower level sensor and a temperature sensor. The upper level sensor functions to activate the start of circulator for the circulation of crude water through the degassor, and also to activate the start of crude water heater. When the level of water in the container falls, the lower level sensor functions to activate opening of the outlet means so as to discharge remaining undistilled water. The temperature sensor functions to cause circulation to the degassor to stop and to cause the circulation of degassed water to the membrane to commence for distillation of degassed water when a predetermined water temperature is reached.

13 Claims, 1 Drawing Sheet

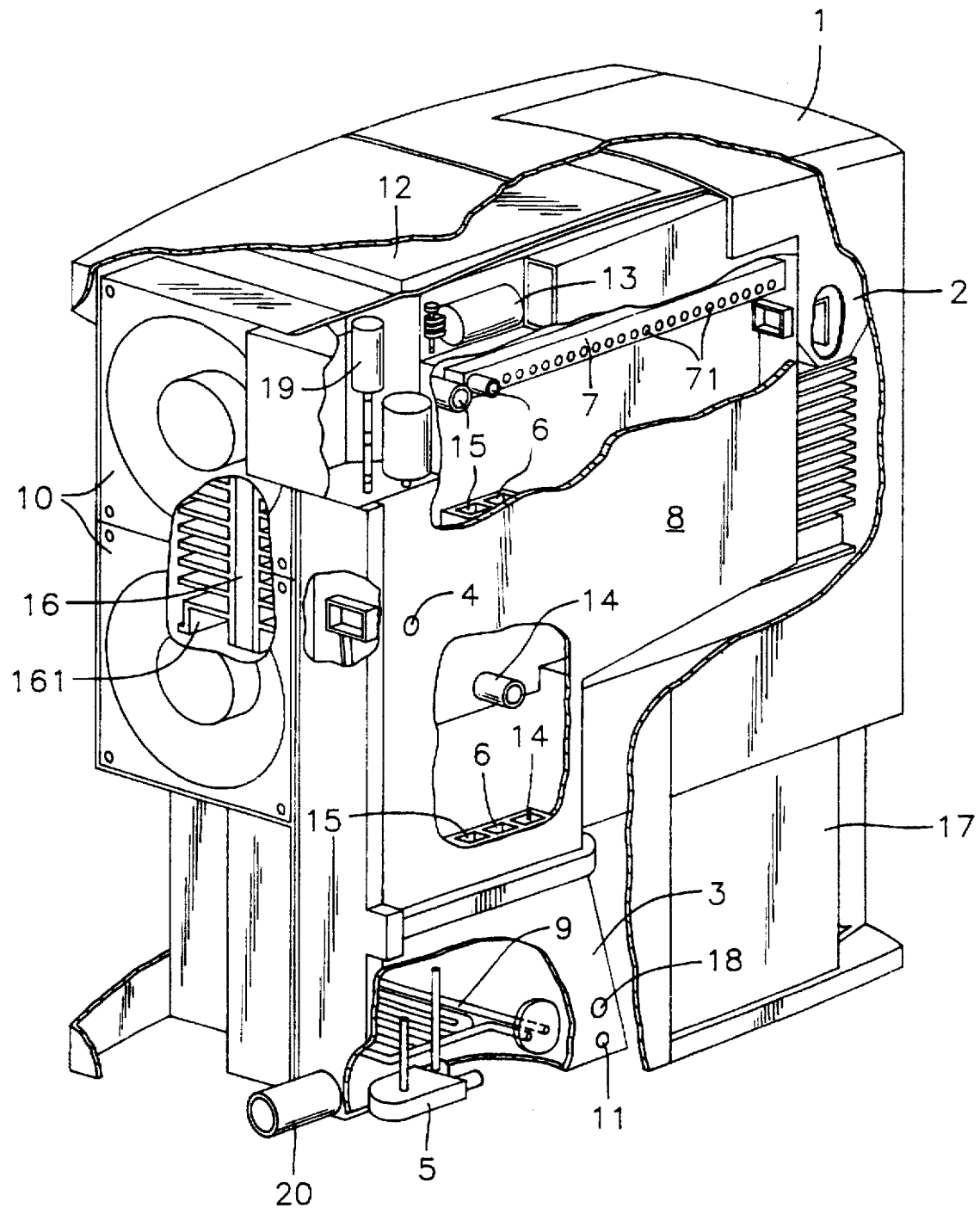

WATER PURIFIER HAVING DEGASSOR AND MEMBRANE DISTILLATION ELEMENTS

FIELD OF THE INVENTION

The present invention relates to a water purifier of the kind defined in the preamble of claim 1, and then particularly to a water purifier for domestic use. More specifically, the invention relates to a water purifier which purifies water by membrane distillation.

BACKGROUND OF THE INVENTION

Membrane distillation per se is known to the art. For instance, European Patent Specification EP-0 118 760 teaches an arrangement for separating a volatile component from a solution, by pervaporation through vapour permeable membranes. These membranes are stretched in frames which separate different chambers one from the other. Crude water flows upwards in crude medium chambers at the same time as hot water flows down in heating chambers. Permeate is obtained in separate intermediate permeate chambers, by vaporization through the membranes.

The German Patent Specification DE 3441190 also discloses pervaporation through membranes from crude medium chambers to permeate chambers, which are cooled with the aid of coolant on a side opposite the associated crude medium chamber.

Although these and similar devices fulfil the purpose for which they are intended, they are not suited as a product for, e.g., domestic use, i.e. a use in which relatively small quantities of water are concerned and where purity demands and demands for very easy handling of the device are very high. The object of the present invention is to provide a water purifier of this kind.

SUMMARY OF THE INVENTION

The inventive water purifier is defined in the characterizing clause of claim 1 and includes degassing means, membrane means and outlet means. The degassing means functions to degas incoming crude water prior to commencing membrane distillation. The membrane means functions to distill degassed water. The outlet means functions to empty remaining degassed, undistilled water when the level of degassed undistilled water has fallen to a predetermined lower level.

According to a further development of the invention the water purifier includes a container for incoming crude water. The container is provided with upper and lower level sensors and a temperature sensor, when the crude water reaches an upper level in the container the upper level sensor functions to activate the start of circulation means for the circulation of crude water to the degassing means and also the start of crude water heating means, when the falling water level reaches the lower water level in the container, the lower level sensor functions to activate opening of the outlet means so as to discharge the undistilled water that remains. Furthermore, when the temperature of the crude water reaches a given value, the temperature sensor functions to cause circulation to the degassing means to stop and to cause the circulation of degassed water to the membrane means, where distillation takes place, to begin.

These and other characteristic features of an inventive water purifier are set forth in the following claims.

BRIEF DESCRIPTION OF THE FIGURE

The invention will now be described in more detail with reference to an exemplifying embodiment thereof and also with reference to the accompanying sole figure, which illustrates an inventive water purifier schematically and in perspective, with parts being cut away so that the construction can be more easily seen.

DETAILED DESCRIPTION OF THE PREFERRED EMBODIMENT

The illustrated water purifier includes within a closed housing:

a fixed container 3 intended for incoming crude water and having fitted thereto an upper level sensor 4, a lower level sensor 18 and a temperature sensor 11;

degassing means 7;

fan means 10 mounted in the vicinity of the degassing means 7;

membrane means 16 fitted with air cooling means 161;

crude water circulating means 5;

crude water heating means 9;

outlet means 20 for discharging remaining quantities of degassed undistilled water and excess crude water and also possible products of degassification; and two removable cans or bins 17 (only one of which is shown) for purified water.

A brief description of the way in which the purifier functions, 1–4:

1. Filling

Crude water is introduced into the purifier through an openable lid 1; the water runs past a waterseal 2 and a degassing tower 8 and down into the fixed container 3, which has a capacity of about 3.6 liters.

2. Degassing

When the level of water in the fixed container 3 has risen to the level of the upper level sensor 4, the circulation means 5 (pump), the heating means 9 (immersion heater) and the fan means 10 are started-up. The crude water circulates through conduits 6 from the fixed container 3 to the degassing means 7 in the tower 8, where the water sprays out through a plurality of holes 71 and forms a thin film on the walls of the tower 8. The water runs down, back to the container 3. Degassification products are sucked upwards by the upper fan means 10 and transported through a conduit (not shown) where condensation takes place, down to the outlet means 20.

3. Distillation

The temperature sensor 11 senses the temperature of the crude water as it circulates. When the crude water reaches a temperature of about 98° C., a signal is sent to an electronic card 12 (processor) commanding the opening of a solenoid valve 13. The water is now degassed and shall be led—instead of to the degassing means 7—to membrane cassettes in the membrane means 16 and from there through conduits 15 back to the fixed container 3 for heating. The hot water delivers vapour to the cooling chamber via the cassette membranes, and the vapour condenses against cooling profiles, which are air cooled. Purified water runs down into the removable cans 17.

4. Emptying

The level of water in the container 3 falls as distillation continues. When the water level reaches the lower level sensor 18, the sensor sends a signal to the processor 12 commanding a solenoid valve 19 to open the outlet means 20, whereby all remaining undistilled water (about 1.4 liters) is removed from the container 3. Emptying continues for about 5 minutes. The cans 17 now contain about two litres of purified water, produced in about one hour. After being emptied, the purifier can be refilled with crude water and the process repeated, automatically.

If during the distillation process the temperature of the water should deviate from a given specific temperature, e.g. a temperature of 98° C., by a specific amount, e.g. by 3° C., the temperature sensor 11 will send to the processor 12 a signal ordering the valve 13 to be closed, whereby degassing is restarted and the total amount of water remaining is heated before recommencing purification of the water through membrane distillation (the water will then have been heated to a temperature of 98° C.). Expressed more generally, the aforesaid specified amount may be at maximum about 3% of the specified temperature. Because not all of the crude water taken into the purifier is distilled, it is possible that any contaminants that have not been eliminated in the degassing process will remain in the volume of water that is left and the water may therefore contain an increased particle concentration when led away through the outlet 20. If crude water is introduced into the purifier through the intake at the lid 1 during the emptying process, this water will be led to the outlet 20 immediately and automatically.

When crude water is purified in the described exemplifying water purifier, the water entering the cans 17 will have a temperature of about 40° C. This water can be cooled to a temperature of 8°–10° C., by mounting a cooling loop in a known manner immediately upstream of the intake to the cans 17.

The apparatus is also constructed so that if one of the cans 17 is removed during the distillation process (to use the purified water contained therein) that water which would otherwise be delivered to the can concerned is instead led directly to the outlet 20.

Volatile substances present in the crude water are eliminated from the water after filling the container with about 3–4 liters of water, by virtue of the fact that the total amount of crude water is caused to circulate while being heated to a final temperature of 98° C., e.g. at a rate of about 3–6 liters per minute, and is so pumped through the degassing tower that a thin film of water is formed on the inner surfaces of the tower. A suction channel provided in the tower communicates with a fan which sucks away undesirable substances continuously during the entire circulation and heating process, these substances having been released with water vapour and running out through the outlet. When the crude water has reached a temperature of 98° C., all volatile substances will have been eliminated. The process then passes automatically to the membrane distillation phase for the removal of solid particles and ions.

In tests carried out on crude water containing 1000 μg THM (trihalomethanes) per liter of water, such as chloroform, bromoform, bromo-dichloromethane and dibromo-chloromethane,it was found that subsequent to removing the contaminants the amount of THM remaining in the water was less than 0.1 μg per liter of water, despite the fact that the boiling points of the majority of these contaminants were above 98° C.

Thus, the inventive water purifier is effective in purifying crude water to a very high degree of purification, as mentioned earlier. The degree of purity achieved with the inventive purifier has been evaluated in different test procedures carried out both before and after purifying the water. The following results were obtained:

| 1. Chlorine | from 3.4 mg/l to below 0.01 mg/l |
| 2. Trihalomethanes | from 1000 μg/l to below 1 μg/l |
| 3. Chloride | from 31000 ppm to less than 1 ppm |
| 4. Radioactivity | |
| 4.1 Strontium | purification better than 99% |
| 4.2 Radium | purification better than 99.9% |
| 4.3 Plutonium | purification better than 99% |
| 4.4 Cesium 134 | from 2.4 ± 0.2 Bq to 0 Bq |
| 5. Bacteria | |
| after 2 days | from 3800 to 0 |
| after 7 days | from 14000 to 0 |

It will be understood that the invention is not restricted to the illustrated and described embodiment thereof and that the invention can be implemented in any desired manner within the scope of the following claims.

We claim:

1. A water purifier for producing pure water by membrane distillation of crude water, the purifier comprising:

a container for receiving incoming crude water;

degassing means for degassing the crude water to form degassed crude water and returning the degassed crude water to said container;

membrane means for membrane distillation of the degassed crude water to form purified water and passing the purified water to a purified water collecting vessel;

a lower level sensor attached to said container for sensing a predetermined lower level of water remaining in said container;

outlet means activated by said lower level sensor for discharging from said container the water remaining in said container when the level of water remaining in said container has fallen to said predetermined lower level;

an upper level sensor attached to said container, wherein when the crude water reaches a predetermined upper level in the container the upper level sensor activates circulation means for circulation of crude water to the degassing means and then back to the container, and also activates crude water heating means; and a temperature sensor, wherein when the temperature of the crude water reaches a predetermined value, the temperature sensor causes circulation of crude water to the degassing means to stop and causes the circulation of degassed water to the membrane means to commence for distillation of the degassed water.

2. A water purifier according to claim 1, comprising a fan in the vicinity of the degassing means for removing by suction gaseous products formed by degassing the crude water and transporting the gaseous products to said outlet means, and further comprising means for condensing said gaseous products during transportation of the gaseous products to said outlet means.

3. A water purifier according to claim 1, wherein the temperature sensor is intended to interrupt commenced membrane distillation when the temperature of the crude water deviates from a predetermined temperature by a given amount, and to start degassing and heating of the total amount of crude water remaining in said container prior to restarting membrane distillation.

4. A water purifier according to claim 3, wherein the temperature sensor is adapted to interrupt membrane distillation of the crude water when the temperature deviation of the crude water reaches an amount which is at maximum 3% of said predetermined temperature.

5. A water purifier according to claim 1, wherein the purified water collecting vessel further comprises two readily removable purified water collecting vessels, wherein each of said vessels is capable of receiving about half of the volume of distilled water formed from crude water filling the container up to said upper crude water level.

6. A water purifier according to claim 1, comprising air cooling the membrane means.

7. A water purifier comprising:

a container for receiving crude water;

a degassor for degassing the crude water to form degassed crude water;

a membrane for purifying the degassed crude water to form purified water;

a heater for heating water in said container;

a circulator for selectively circulating water to said degassor and said membrane;

an upper level sensor provided on said container for sensing a predetermined upper level of water in said container and, when the water in said container reaches the predetermined upper level, for activating said heater and said circulator to circulate the crude water to the degassor and return the degassed crude water back to said container; and, a temperature sensor for detecting a predetermined temperature of water in said container and, when the water in said container reaches a predetermined temperature, for stopping circulation of water to the degassor and activating the circulator to instead circulate the degassed crude water to said membrane and pass the purified water to a purified water vessel.

8. The water purifier of claim 7, further comprising a lower level sensor connected to said container for sensing a predetermined lower level of water in said container and an outlet activated by said lower level sensor for discharging from said container the water in said container when the level of water in said container has fallen to said predetermined lower level.

9. The water purifier of claim 7, further comprising a fan in the vicinity of the degassor for removing by suction gaseous products formed by degassing the crude water, and transporting the gaseous products to an outlet, and further comprising a condenser for condensing the gaseous products during transportation of the gaseous products to the outlet.

10. A water purifier according to claim 7, wherein said temperature sensor interrupts circulation of water to said membrane when the temperature of the crude water deviates from the predetermined temperature by a given amount, and to start degassing and heating of the water in said container prior to restarting circulation of water to said membrane.

11. A water purifier comprising:

a container for receiving incoming crude water;

a degassor for degassing the crude water to form degassed crude water;

a membrane for purifying the degassed crude water to form purified water and for passing the purified water to a purified water collecting vessel;

a circulator for selectively circulating water to said degassor and said membrane;

an upper level sensor connected to said container for sensing a predetermined upper level of water in said container and, when the water in said container reaches said predetermined upper level, for activating said circulator to circulate water to said degassor;

a fan in the vicinity of the degassor for removing by suction gaseous products formed by degassing the crude water and transporting the gaseous products to an outlet; and means for condensing said gaseous products during transportation of the gaseous products to said outlet.

12. The water purifier of claim 11, further comprising an outlet for discharging water in said container and a lower level sensor connected to said container for sensing a predetermined lower level of water in said container and, when the water in said container reaches said predetermined lower level, for passing the water in said container to said outlet.

13. A water purifier comprising:

a container for receiving incoming crude water;

a degassor for degassing the crude water to form degassed crude water;

a membrane for purifying the degassed crude water to form purified water and for passing the purified water to a purified water collecting vessel;

a circulator for selectively circulating water to said degassor and said membrane;

an upper level sensor connected to said container for sensing a predetermined upper level of water in said container and, when the water in said container reaches said predetermined upper level, for activating said circulator to circulate water to said degassor; and a temperature sensor, wherein when the crude water reaches the predetermined upper level in the container, a heater is activated and, when the temperature of the crude water reaches a predetermined value, the temperature sensor causes circulation of crude water to the degassor to stop and causes said circulator to circulate degassed water to said membrane.

* * * * *